(12) United States Patent
Lee et al.

(10) Patent No.: US 11,967,829 B2
(45) Date of Patent: Apr. 23, 2024

(54) APPARATUS AND METHOD FOR ESTIMATING CHANNEL OF WIRELESS POWER TRANSMISSION SYSTEM USING INTELLIGENT REFLECTING SURFACE

(71) Applicant: UIF (University Industry Foundation), Yonsei University, Seoul (KR)

(72) Inventors: Chungyong Lee, Seoul (KR); Sangwon Jung, Seoul (KR); Chaehun Im, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 17/687,349

(22) Filed: Mar. 4, 2022

(65) Prior Publication Data

US 2023/0283105 A1    Sep. 7, 2023

(51) Int. Cl.
*H02J 50/00* (2016.01)
*H01Q 3/40* (2006.01)
*H02J 50/40* (2016.01)

(52) U.S. Cl.
CPC ............ *H02J 50/001* (2020.01); *H01Q 3/40* (2013.01); *H02J 50/40* (2016.02)

(58) Field of Classification Search
CPC ............ H02J 50/00; H02J 50/40; H01Q 3/40
See application file for complete search history.

(56) References Cited

U.S. PATENT DOCUMENTS

| | | | |
|---|---|---|---|
| 2021/0126359 A1* | 4/2021 | Kim | H04B 7/145 |
| 2021/0167873 A1* | 6/2021 | Lerosey | H04B 17/102 |
| 2022/0123803 A1* | 4/2022 | Rimalapudi | H04B 7/0626 |
| 2023/0097583 A1* | 3/2023 | Lee | H04W 16/28 |
| | | | 370/329 |
| 2023/0180094 A1* | 6/2023 | Gurelli | H04B 7/088 |
| | | | 370/336 |

FOREIGN PATENT DOCUMENTS

KR    101678640 B1    11/2016

OTHER PUBLICATIONS

Zhaorui Wang, et al., "Channel Estimation for Intelligent Reflecting Surface Assisted Multiuser Communications", IEEE Transactions on Wireless Communications, vol. 19, No. 10, Oct. 2020.
Beixiong Zheng, et al., "Intelligent Reflecting Surface-Enhanced OFDM: Channel Estimation and Reflection Optimization", IEEE Wireless Communications Letters, vol. 9, No. 4, Apr. 2020.

* cited by examiner

*Primary Examiner* — Hal Kaplan
*Assistant Examiner* — Joseph N Inge

(57) ABSTRACT

The apparatus and the method for estimating a channel of a wireless power transmission system using an intelligent reflecting surface according to the exemplary embodiment of the present disclosure check a strength of a received signal received by a terminal with respect to a measured signal transmitted from the transmitter, regardless of the number of reflective elements of the intelligent reflecting surface (IRS) or the number of terminals and estimate a channel between the transmitter and the intelligent reflecting surface (IRS) and the channel between the intelligent reflecting surface (IRS) and the terminal so that the channel information can be efficiently acquired even in the wireless power transmission system including a low power terminal.

13 Claims, 4 Drawing Sheets

APPARATUS AND METHOD FOR ESTIMATING CHANNEL OF WIRELESS POWER TRANSMISSION SYSTEM USING INTELLIGENT REFLECTING SURFACE

BACKGROUND

Field

The present disclosure relates to an apparatus and a method for estimating a channel of a wireless power transmission system using an intelligent reflecting surface (IRS), and more particularly, an apparatus and a method for estimating a channel in a wireless power transmission system using an intelligent reflecting surface (IRS).

Description of the Related Art

Recently, in accordance with the development of a wireless network technology, a number of internet of things (IoT) terminals is rapidly increasing. In order to effectively manage a large scale wireless network, a stable power supply system for the Internet of Things (IoT) terminal is necessary. To this end, recently, a radio frequency (RF) signal based wireless power transmission (or wireless energy transfer (WET)) system is attracting attention.

Specifically, in order to enhance the efficiency of the wireless energy transmission, studies on the usage of the intelligent reflecting surfaces (IRS) are actively being conducted.

FIG. 1 is a view for explaining a concept of a wireless power transmission system using an intelligent reflecting surface.

Referring to FIG. 1, the wireless power transmission system using an intelligent reflecting surface (IRS) may include a transmitter 10, a controller 20, and an intelligent reflecting surface (IRS) 30, and K terminals (40-1 to 40-K).

The transmitter 10 transmits the power signal to the K terminals 40-1 to 40-K. By doing this, the K terminals 40-1 to 40-K may harvest a wireless energy required for an operation from the power signal transmitted from the transmitter 10. Here, in order to enhance the power transmission efficiency, the transmitter 10 includes M antennas to beamform and transmit the power signal. Each of K terminals 40-1 to 40-K may one antenna.

In order to more efficiently transmit the power signal emitted from the transmitter to the K terminals 40-1 to 40-K, the intelligent reflecting surface (IRS) 30 reflects the power signal transmitted from the transmitter 10 while shifting a phase of the power signal by N reflective elements in accordance with the control of the controller 20.

In the Internet of Things (IoT) system, K terminals 40-1 to 40-K may be distributed in various arbitrary locations. Accordingly, even though the transmitter 10 including a plurality of antennas transmits the power signal using a beamforming technique, in many cases, there is a difficulty to sufficiently supply the power required according to the arrangement location of the K terminals 40-1 to 40-K. Specifically, when an obstacle is located between the transmitter 10 and K terminals 40-1 to 40-K, it is very hard for the transmitter 10 to stably supply the power to each terminal even though the beamforming technique is used.

In order to overcome this restriction, the intelligent reflecting surface (IRS) 30 reflects the power signal transmitted from the transmitter 10 to be stably transmitted toward K terminals 40-1 to 40-K. At this time, the intelligent reflecting surface (IRS) 30 reflects the power signal transmitted from the transmitter while shifting a phase thereof to improve the power transmission efficiency.

The controller 20 may control a reflection phase of the intelligent reflecting surface (IRS) 30 according to a beamforming vector of a power signal transmitted from the transmitter 10. Further, the controller may transmit reflection phase information of the intelligent reflecting surface (IRS) 30 to the transmitter 10. Then, the transmitter 10 may change the beamforming vector.

However, in order to allow the transmitter 10 and the controller 20 to adjust the beamforming vector and the reflecting phase so as to efficiently transmit the power signal to K terminals 40-1 to 40-K, channel state information (CSI) between the transmitter 10 and K terminals 40-1 to 40-K should be known in advance.

In the wireless power transmission system using the intelligent reflecting surface (IRS) 30 as illustrated in FIG. 1, a channel is divided into a channel (transmitter-IRS link) G(t) between the transmitter 10 and the intelligent reflecting surface (IRS) 30 and a channel (IRS-Device link) h(t) between the intelligent reflecting surface (IRS) 30 and K terminals 40-1 to 40-K. Further, h(t) which is a channel (IRS-Device link) between the intelligent reflecting surface (IRS) 30 and K terminals 40-1 to 40-K may be divided into K channels h(t)={$h_1(t), h_2(t), \ldots, h_K(t)$} between the intelligent reflecting surface (IRS) 30 and each of K terminals 40-1 to 40-K. Accordingly, in the wireless energy transmission system using the intelligent reflecting surface (IRS) 30, it is not easy to acquire the channel state information (CSI) between the transmitter 10 and K terminals 40-1 to 40-K.

As the simplest method, there is a method for estimating a channel by allowing the transmitter 10 to individually transmit pilot signals for all the N reflective elements of the intelligent reflecting surface (IRS) 30 and K terminals 40-1 to 40-K. In this case, a length of the pilot signal needs to be equal to or higher than a value (NK) obtained by multiplying the number N of reflective elements and the number K of terminals and each of K terminals 40-1 to 40-K needs to transmit a response to the pilot signal having a length which is NK or longer to the transmitter 10.

Generally, the number N of reflective elements of the intelligent reflecting surface (IRS) 30 is 16 or larger so that the length of the pilot signal may be geometrically increased according to the number of terminals. Accordingly, when K terminals 40-1 to 40-K receive the pilot signal and transmit the response thereto to the transmitter 10, power consumption is significantly caused.

K terminals 40-1 to 40-K which are wirelessly supplied with the power by means of the power signal are vulnerable to power consumption. Further, if the pilot signal having a long length is transmitted and received to increase the wireless power supplying effectiveness, it is very inefficient.

Accordingly, a technique which efficiently estimates the channel state information (CSI) in the wireless power transmission system using the intelligent reflecting surface (IRS) 300 is demanded.

SUMMARY

An object to be achieved by the present disclosure is to provide an apparatus and a method for estimating a channel of a wireless power transmission system using an intelligent reflecting surface which easily estimate a channel on the basis of a strength of the received signal, regardless of the number of reflective elements of an intelligent reflecting surface (IRS) or the number of terminals in a wireless power transmission system using an intelligent reflecting surface (IRS).

Another object to be achieved by the present disclosure is to provide an apparatus and a method for estimating a channel of a wireless power transmission system using an intelligent reflecting surface which estimate a channel even with a low energy of a low power Internet of Things (IoT) terminal in a wireless power transmission system using an intelligent reflecting surface (IRS).

Other and further objects of the present invention which are not specifically described can be further considered within the scope easily deduced from the following detailed description and the effect.

In order to achieve the above-described technical objects, according to an aspect of the present disclosure, a channel estimating apparatus of a wireless power transmission system using an intelligent reflecting surface is a channel estimating apparatus of a wireless power transmission system including a transmitter which transmits a power signal and intelligent reflecting surfaces (IRS) which reflect the power signal transmitted from the transmitter to transmit the power signal to a plurality of terminals, including: a channel estimating unit which estimates a transmitting channel which is a channel between the transmitter and the intelligent reflecting surface (IRS) and a reflecting surface channel which is a channel between the intelligent reflecting surface (IRS) and the terminal, on the basis of a measuring beamforming vector which is generated to allow the transmitter to transmit a measuring signal, a measuring phase shift matrix which is generated to allow the intelligent reflecting surface (IRS) to designate a phase adjusted while reflecting the measuring signal, and a received signal strength (RSS) fed back from a terminal which receives the measuring signal.

Here. the channel estimating unit estimates the transmitting channel and the reflecting surface channel by repeatedly performing a process of fixing two variables of the estimating variable set and alternatively updating the remaining one variable, on the basis of an estimating variable set including the transmitting channel, the reflecting surface channel, and a phase variable representing a phase of the measuring signal received from the terminal.

Here, the channel estimating unit estimates the transmitting channel and the reflecting surface channel by repeatedly performing the process of fixing two variables of the estimating variable set and alternatively updating the remaining one variable until a value of the variable is converged within a predetermined range, on the basis of an initial value of the estimating variable set.

Here, the channel estimating unit includes: a phase variable updating unit which fixes the transmitting channel and the reflecting surface channel and updates the phase variable by means of the fixed transmitting channel, the fixed reflecting surface channel, the measuring beamforming vector, the measuring phase shift matrix, and the received signal strength (RSS), on the basis of the initial value of the estimating variable set; a reflecting surface channel updating unit which fixes the transmitting channel according to the initial value of the estimating variable set and the updated phase variable and updates the reflecting surface channel; a transmitting channel updating unit which fixes the updated phase variable and the updated reflecting surface channel and updates the transmitting channel using a successive convex approximation technique; and a convergence determining unit which determines whether the updated variables of the estimating variable set are converged and acquiring the reflecting surface channel and the transmitting channel according to the updated estimating variable set as estimating channel information when it is determined that the variables are converged.

Here, when it is determined that a deviation between the updated estimating variable set and the previous estimating variable set is converged with a predetermined range, the convergence determining unit acquires the reflecting surface channel and the transmitting channel according to the updated estimating variable set as the estimating channel information, and when it is determined that a deviation between the updated estimating variable set and the previous estimating variable set is not converged within a predetermined range, the convergence determining unit transmits the updated estimating variable set to the phase variable updating unit to update the phase variable, the reflecting surface channel, and the transmitting channel again the initial value of the estimating variable set indicates the estimating variable set which is updated latest recently in a current time slot and when there is no estimating variable set which is updated in the current time slot, indicates an estimating variable set which is updated lastly in a time slot previous to the current time slot.

Here, the phase variable updating unit updates the phase variable by Equation 1 on the basis of the fixed transmitting channel, the fixed reflecting surface channel, the measuring beamforming vector, the measuring phase shift matrix, and the received signal strength (RSS), Equation 1 is $\emptyset_k$=arg $(M_G h_k)$, $\forall k$. $h_k$ is a k-th reflective surface channel between the intelligent reflecting surface (IRS) and a k-th terminal during L predetermined previous time slots, $\emptyset_k$ is the phase variable applied to add phase information to the received signal strength (RSS) fed back from the k-th terminal during L previous time slots, and $M_G$ is a transmitting reflecting channel from the transmission of the transmitter to the reflection of the intelligent reflecting surface (IRS) during a period from a current time slot T to L previous time slots and is calculated by Equation 2, Equation 2 is $M_G(T) := [(w^H(T-L+1)G\theta^H(T-L+1))^T, \ldots ,(w^H(t)G\theta^H(T))^T]^T$. w is the measuring beamforming vector, and $\theta$ is the measuring phase shift matrix.

Here, the reflecting surface channel updating unit updates the reflecting surface channel by Equation 3, on the basis of the fixed transmitting channel and the fixed phase variable, [Equation 3] is $h_k = ((\beta_k^\circ M_G)^H \tilde{R}_k^{-1}(\beta_k^\circ M_G))^{-1}(\beta_k^\circ M_G)^H \tilde{R}_k^{-1}(r_k^\circ e^{j\emptyset_k})$, $\forall k$, $\beta_k$ is a channel correlation coefficient determined by a velocity of the k-th terminal during L previous time slots, $r_k$ is the received signal strength (RSS) fed back from the k-th terminal during L previous time slots, $\circ$ is a hadamard product symbol, $\tilde{R}_k$ is an approximated covariance matrix acquired by approximating a covariance matrix $R_k$ for a Gaussian noise vector between the transmitter and the k-th terminal during L previous time slots.

Here, the reflecting surface channel updating unit approximates and acquires the covariance vector $R_k$ for the Gaussian noise vector which calculates the approximated covariance matrix $\tilde{R}_k$ by Equation 4, by Equation 5, [Equation 4] is $$[R_k(T)]_{p,q} = \begin{cases} \sigma_k^2 + (\beta_k^{2(p-L)} - 1)w^H(p')GG^H w(p') & p = q \\ (\beta_k^{p+q-2L} - \beta_k^{-|q-p|})w^H(p')G\theta^H(p')\theta(q')G^H w(q') & p \neq q \end{cases},$$

p'=T−L+p,q'=T−L+q, p and q are a row and a column of the covariance matrix $R_k$, respectively, and [Equation 5] is $$[\tilde{R}_k]_{p,q} = \begin{cases} [R_k]_{p,q} & p = q \\ 0 & p \neq q \end{cases}.$$

Here, the transmitting channel updating unit updates the transmitting channel by Equation 6, on the basis of the fixed phase variable and the fixed reflecting surface channel, [Equation 6] is $$G = \bar{G} - \frac{\nabla h(\bar{G})}{K},$$

here, Ğ is the transmitting channel G before being updated, K is a step size acquired by a backtracking line search method, and $\nabla h(G)$ is a gradient of the reflecting surface channel according to the transmitting channel.

Here, the transmitting channel updating unit $$\nabla h(G)$$

calculates the gradient $\nabla h(G)$ by Equation 7, [Equation 7] is $$\nabla h(G) = \sum_{k=1}^{K} \sum_{l=1}^{L} 2 \left[ \frac{(\beta_k^{2(l-L)} - 1)w(l')w^H(l')G}{(\sigma_k^2 + (\beta_k^{2(l-L)} - 1)\|w^H(l')G\|^2)} - \right.$$

$$\frac{(\beta_k^{2(l-L)} - 1)w(l')w^H(l')G}{((\sigma_k^2 + (\beta_k^{2(l-1L)} - 1)\|w^H(l')G\|^2))^2} -$$

$$\left. \frac{\beta_k^{-L+1} w(l')(h_k)^H \theta(l')(r_k(l')e^{j\theta_k(l')} - \beta_k^{-L+1}w^H(l')G\theta^H(l')h_k)}{(\sigma_k^2 + (\beta_k^{2(l-L)} - 1)\|w^H(l')G\|^2)} \right], l' = T - L + 1,$$

and $\sigma_k^2$ is a standard deviation of a Gaussian noise between the transmitter and the k-th terminal.

Here, the measuring beamforming vector is generated to follow a complex Gaussian distribution which has an average of 0 and a variance according to a ratio of an average measuring power of the transmitter and a number of antennas of the transmitter.

Here, the measuring phase shift matrix is generated such that the phase shift of the measuring signal according to N reflective elements of the intelligent reflecting surface (IRS) are uniformly distributed in the range of 0 to 2π independently to the time.

In order to achieve the above-described technical objects, according to another aspect of the present disclosure, a channel estimating method of a wireless power transmission system using an intelligent reflecting surface is a channel estimating method of a wireless power transmission system including a transmitter which transmits a power signal and intelligent reflecting surfaces (IRS) which reflect the power signal transmitted from the transmitter to transmit the power signal to a plurality of terminals including: estimating a transmitting channel which is a channel between the transmitter and the intelligent reflecting surface (IRS) and a reflecting surface channel which is a channel between the intelligent reflecting surface (IRS) and the terminal, on the basis of a measuring beamforming vector which is generated to allow the transmitter to transmit a measuring signal, a measuring phase shift matrix which is generated to allow the intelligent reflecting surface (IRS) to designate a phase adjusted while reflecting the measuring signal, and a received signal strength (RSS) fed back from a terminal which receives the measuring signal.

Here, in the channel estimating step, the transmitting channel and the reflecting surface channel are estimated by repeatedly performing a process of fixing two variables of the estimating variable set and alternatively updating the remaining one variable, on the basis of an estimating variable set including the transmitting channel, the reflecting surface channel, and a phase variable representing a phase of the measuring signal received from the terminal.

Here, in the channel estimating step, the transmitting channel and the reflecting surface channel is estimated by repeatedly performing the process of fixing two variables of the estimating variable set and alternatively updating the remaining one variable until a value of the variable is converged within a predetermined range, on the basis of an initial value of the estimating variable set.

Here, the channel estimating step includes: fixing the transmitting channel and the reflecting surface channel and updating the phase variable by means of the fixed transmitting channel, the fixed reflecting surface channel, the measuring beamforming vector, the measuring phase shift matrix, and the received signal strength (RSS), on the basis of the initial value of the estimating variable set; fixing the transmitting channel according to the initial value of the estimating variable set and the updated phase variable and updating the reflecting surface channel; fixing the updated phase variable and the updated reflecting surface channel and updating the transmitting channel using a successive convex approximation technique; and determining whether the updated variables of the estimating variable set are converged and acquiring the reflecting surface channel and the transmitting channel according to the updated estimating variable set as estimating channel information when it is determined that the variables are converged Here, in the acquiring of estimating channel information, when it is determined that a deviation between the updated estimating variable set and the previous estimating variable set is converged with a predetermined range, the reflecting surface channel and the transmitting channel according to the updated estimating variable set are acquired as the estimating channel information, and when it is determined that a deviation between the updated estimating variable set and the previous estimating variable set is not converged within a predetermined range, the phase variable updating step, the reflecting surface channel updating step, and the transmitting channel updating step are performed again to update the phase variable, the reflecting surface channel, and the transmitting channel.

Here, the measuring beamforming vector is generated to follow a complex Gaussian distribution which has an average of 0 and a variance according to a ratio of an average measuring power of the transmitter and a number of antennas of the transmitter and the measuring phase shift matrix is generated such that the phase shift of the measuring signal according to N reflective elements of the intelligent reflecting surface (IRS) are uniformly distributed in the range of 0 to 2π independently to the time.

In order to achieve the above-described technical objects, a terminal according to another aspect of the present disclosure is a terminal which receives a power signal which is wirelessly transmitted through a wireless power transmission system including a transmitter which transmits a power signal and intelligent reflecting surfaces (IRS) which reflect the power signal transmitted from the transmitter to transmit the power signal to a plurality of terminals to perform the wireless energy harvesting. The terminal receives a measuring signal from the wireless power transmission system, measures a received signal strength (RSS) which is a scalar value for the received measuring signal, and transmits only the measured received signal strength (RSS) to the wireless power transmission system.

According to the apparatus and the method for estimating a channel of a wireless power transmission system using an intelligent reflecting surface according to the exemplary embodiment of the present disclosure, a strength of a received signal received by a terminal with respect to a measured signal transmitted from the transmitter is checked, regardless of the number of reflective elements of the intelligent reflecting surface (IRS) or the number of terminals and a channel between the transmitter and the intelligent reflecting surface (IRS) and a channel between the intelligent reflecting surface (IRS) and the terminal can be estimated on the basis of the checked received signal strength so that the channel information can be efficiently acquired even in the wireless power transmission system including a low power terminal.

The effects of the present invention are not limited to the technical effects mentioned above, and other effects which are not mentioned can be clearly understood by those skilled in the art from the following description

DETAILED DESCRIPTION OF THE EMBODIMENT

Figure 1:
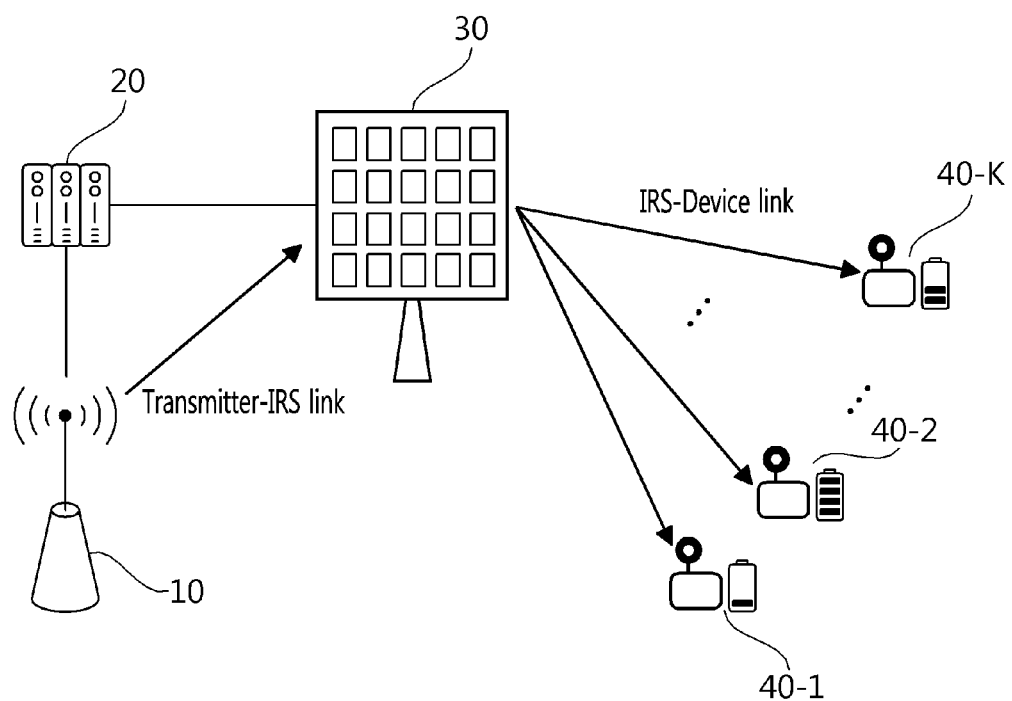
FIG. 1 is a view for explaining a concept of a wireless power transmission system using an intelligent reflecting surface.

Hereinafter, embodiments of the present disclosure will be described in detail with reference to the accompanying drawings. Advantages and characteristics of the present invention, and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "~unit" used in the specification refers to a software or hardware component such as a field programmable gate array (FPGA) or an ASIC and "~unit" performs some functions. However, "~unit" is not limited to the software or the hardware. "~unit" may be configured to be in an addressable storage medium or may be configured to reproduce one or more processors. Accordingly, as an example, "~unit" includes components such as software components, object oriented software components, class components, and task components, processes, functions, attributes, procedures, subroutines, segments of a program code, drivers, a firmware, a microcode, a circuit, data structures, and variables. A function which is provided in the components and "~units" may be combined with a smaller number of components and "~units" or divided into additional components and "~units".

Hereinafter, an exemplary embodiment of an apparatus and a method for estimating a channel of a wireless power transmission system using an intelligent reflecting surface according to the present disclosure will be described in detail with reference to the accompanying drawings.

First, a channel estimating apparatus of a wireless power transmission system using an intelligent reflecting surface according to an exemplary embodiment of the present disclosure will be described with reference to FIGS. 2 and 3.

Figure 2:
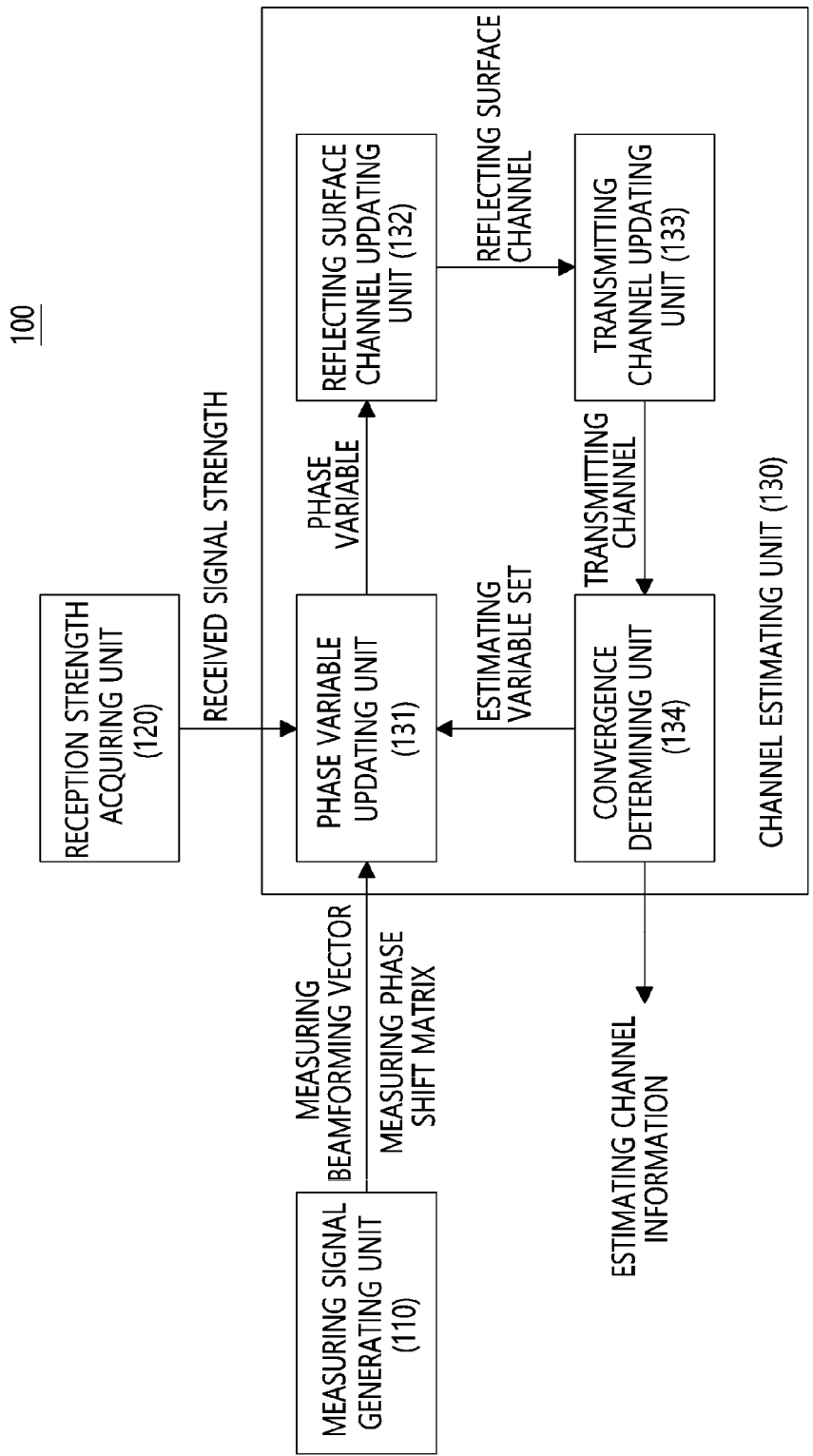
FIG. 2 is a block diagram for explaining an channel estimating apparatus of a wireless power transmission system using an intelligent reflecting surface according to an exemplary embodiment of the present disclosure.

FIG. 2 is a block diagram for explaining an channel estimating apparatus of a wireless power transmission system using an intelligent reflecting surface according to an exemplary embodiment of the present disclosure.

A channel estimating apparatus of a wireless power transmission system using an intelligent reflecting surface according to an exemplary embodiment of the present disclosure (hereinafter, simply referred to as a channel estimating apparatus") 100 may easily estimate a channel on the basis of a strength of a received signal, regardless of a number of reflective elements of the intelligent reflecting surface (IRS) 30 or a number of terminals, in a wireless power transmission system using an intelligent reflecting surface (IRS) 30.

Here, the channel estimating apparatus 100 may be configured to be included in the transmitter 10 in the wireless power transmission system, and may also be configured to be included in the controller 20, depending on the exemplary embodiment. For the convenience of description of the channel estimating apparatus 100 according to the present disclosure, it is assumed that the channel estimating apparatus 100 is included in the transmitter 10.

Referring to FIG. 2, the channel estimating apparatus 100 according to the present disclosure may include a measuring signal generating unit 110, a reception strength acquiring unit 120, and a channel estimating unit 130.

The measuring signal generating unit 110 generates a measuring signal to be transmitted from the transmitter 10 to K terminals 40-1 to 40-K to estimate a channel.

Here, the measuring signal may be a predetermined signal to measure a strength of a received signal received from the K terminals 40-1 to 40-K, and may be a unit signal or a pilot signal.

At this time, the measuring signal generating unit 110 may arbitrarily a measuring beamforming vector w(t) to allow the transmitter 10 including M antennas to transmit the measuring signal in a t-th time slot t. Even though a beamforming vector for a measuring signal used for channel estimation and a beamforming vector for a wireless power transmission signal are the same concept, but for the convenience of the description of the present disclosure, the beamforming vector for the measuring signal used for channel estimation is referred to as a "measuring beamforming vector".

Here, the measuring beamforming vector w(t) may be generated to follow a complex Gaussian distribution which has an average of 0 and a variance according to a ratio $p_0/M$ of an average measuring power $p_0$ and the number M of antennas of the transmitter 10.

Further, the measuring signal generating unit 110 may arbitrarily generate a measuring phase shift matrix Θ(t) indicating a level that N reflective elements of the intelligent reflecting surface (IRS) 30 reflect the measurement signal transmitted from the transmitter 10 to shift a phase in the t-th time slot t. Even though the phase shift matrix for a measuring signal used for channel estimation and the phase shift matrix for a wireless power transmission signal are the same concept, for the convenience of description of the present disclosure, the phase shift matrix for a measuring signal for channel estimation is referred to as a "measuring phase shift matrix".

Here, the measuring phase shift matrix Θ(t)= $(e^{j\varphi_1(t)}, \ldots, e^{j\varphi_n(t)}, \ldots, e^{j\varphi_N(t)})$ of the intelligent reflecting surface (IRS) 30 including N reflective elements may be expressed by a diagonal matrix including phase shift $(e^{j\varphi_1(t)}, \ldots, e^{j\varphi_n(t)}, \ldots, e^{j\varphi_N(t)})$ of each of N reflective elements as elements. That is, the measuring signal generating unit 110 may arbitrarily generate the measuring phase shift matrix Θ(t) such that the phase shift $e^{j\varphi_1(t)}, \ldots, e^{j\varphi_n(t)}, \ldots, e^{j\varphi_N(t)}$ of the measuring signal according to N reflective elements of the intelligent reflecting surface (IRS) 30 are uniformly distributed in the range of 0 to $2\pi$ independently to the time. The transmitter 10 may transmit the measuring signal on the basis of the generated measuring beamforming vector w(t) and measuring phase shift matrix Θ(t).

That is, the measuring signal transmitted from the transmitter 10 reaches the intelligent reflecting surface (IRS) 30 through a channel G(t) between the transmitter 10 and the intelligent reflecting surface (IRS) 30 and is reflected by the N reflective elements of the intelligent reflecting surface (IRS) 30 to be transmitted to K terminals 40-1 to 40-K via the channel h(t) between the intelligent reflecting surface (IRS) 30 and the K terminals 40-1 to 40-K. Hereinafter, for the convenience of description, the channel Gt(t) between the transmitter 10 and the intelligent reflecting surface (IRS) 30 is referred to as a "transmitting channel" and the channel h(t) between the intelligent reflecting surface (IRS) 30 and the K terminals 40-1 to 40-K is referred to as "reflecting surface channel".

Thereafter, a terminal which receives the measuring signal transmitted via the reflecting surface channel h(t) as a receiving signal, among the K terminals 40-1 to 40-K measures a receives signal strength (RSS) and feeds back the measured received signal strength (RSS) to the transmitter 10 again.

At this time, the K terminals 40-1 to 40-K feedback only the received signal strength RSS measured from the transmitted measuring signal, but does not transmit any other information. That is, since only the received signal strength RSS which is a scalar value is returned, power consumption to transmit additional information is not necessary so that the power consumption can be reduced. This is very important issue in the Internet of things (IoT) terminal which is driven with a limited power.

The reception strength acquiring unit 120 is applied with the received signal strength RSS fed-back from the K terminals 40-1 to 40-K to transmit the received signal strength to the channel estimating unit 130.

The channel estimating unit 130 is applied with the received signal strength RSS transmitted from the reception strength acquiring unit 120 and the measuring beamforming vector w(t) and the measuring phase shift matrix Θ(t) generated in the measuring signal generating unit 110 to estimate the transmitting channel G(t) and the reflecting surface channel h(t).

That is, the channel estimating unit 130 may estimate the transmitting channel which is a channel between the transmitter 10 and the intelligent reflecting surface (IRS) 30 and the reflecting surface channel which is a channel between the intelligent reflecting surface (IRS) 30 and the terminal, on the basis of the measuring beamforming vector generated to allow the transmitter 10 to transmit the measuring signal, the measuring phase shift matrix generated to designate a phase to be adjusted by the intelligent reflecting surface (IRS) 30 while reflecting the measuring signal, and the received signal strength RSS fed-back from the terminal which receives the measuring signal.

At this time, the channel estimating unit 130 estimates the transmitting channel and the reflecting surface channel by repeatedly performing a process of fixing two variables of the estimating variable set and alternately updating the remaining one variable, on the basis of an estimating variable set including the transmitting channel, the reflecting surface channel, and a phase variable representing a phase of the measuring signal received from the terminal.

To be more specific, the channel estimating unit 130 repeatedly performs the process of fixing two variables of the estimating variable set and alternately updating the remaining one variable until a value of the variable is converged within a predetermined range, on the basis of an initial value of the estimating variable set, to estimate the transmitting channel and the reflecting surface channel.

Here, the initial value of the estimating variable set indicates an estimating variable set which is updated latest recently in a current time slot and when there is no estimating variable set which is updated in the current time slot, indicates an estimating variable set which is updated lastly in a time slot previous to the current time slot. When there is no previous time slot, the initial value may be set by an arbitrary value.

To this end, the channel estimating unit 130 may include a phase variable updating unit 131, a reflecting surface channel updating unit 132, a transmitting channel updating unit 133, and a convergence determining unit 134.

The phase variable updating unit 131 may update a phase variable of the estimating variable set on the basis of the measuring beamforming vector and the measuring phase shift matrix provided from the measuring signal generating unit 110 and the received signal strength RSS provided from the received signal strength acquiring unit 120.

Here, the phase variable indicates a phase of a measuring signal received from the terminal.

That is, the phase variable updating unit fixes the transmitting channel and the reflecting surface channel and updates the phase variable by means of the fixed transmitting channel, the fixed reflecting surface channel, the measuring beamforming vector, the measuring phase shift matrix, and the received signal strength (RSS) on the basis of the initial value of the estimating variable set including the transmitting channel, the reflecting surface channel, and the phase variable.

The reflecting surface channel updating unit 132 updates the reflecting surface channel of the estimating variable set on the basis of the updated phase variable provided from the phase variable updating unit 131.

That is, the reflecting surface channel updating unit 132 fixes the transmitting channel according to the initial value of the estimating variable set and the phase shift updated by the phase variable updating unit 131 and updates the reflecting surface channel.

The transmitting channel updating unit 133 updates the transmitting channel of the estimating variable set, on the basis of the updated reflecting surface channel provided from the reflecting surface channel updating unit 132.

That is, the transmitting channel updating unit 133 fixes the phase variable updated by the phase variable updating unit 131 and the reflecting surface channel updated by the reflecting surface channel updating unit 132 and updates the transmitting channel using a successive convex approximation technique.

The convergence determining unit 134 determines whether the estimating variable set is converged on the basis of the estimating variable set whose all variables have been updated.

That is, the convergence determining unit 134 determines whether the updated variables of the estimating variable set are converged and when it is determined that the estimating variable set is converged, acquires the reflecting surface channel and the transmitting channel according to the updated estimating variable set as estimating channel information.

Here, the convergence determining unit 134 may determine whether it is converged by comparing the updated estimating variable set and a previous estimating variable set to check whether the change of each variable value of the estimating variable set is gradually reduced as compared with the previous change.

At this time, when it is determined that a deviation between the updated estimating variable set and the previous estimating variable set is converged within a predetermined range, the convergence determining unit 134 may acquire the reflecting surface channel and the transmitting channel according to the updated estimating variable set as estimating channel information.

In contrast, when it is determined that a deviation between the updated estimating variable set and the previous estimating variable set is not converged within a predetermined range, the convergence determining unit 134 may transmit the updated estimating variable set to the phase variable updating unit 131 to update the phase variable, the reflecting surface channel, and the transmitting channel again.

In other words, when the convergence determining unit 134 analyzes the accumulated change of the estimating variable set which is repeatedly updated and determines that the estimating variable set is converged to a specific value, the convergence determining unit 134 stops the updating of the estimating variable set and set the estimating channel information on the basis of the finally updated estimating variable set.

As a result, the channel estimating apparatus 100 according to the present disclosure can estimate all the transmitting channel and the reflecting surface channel which is distinguished by the intelligent reflecting surface (IRS) 30 by feeding back only the received signal strength (RSS) which is a scalar value from the K terminals 40-1 to 40-K so that the power consumption of the terminals 40-1 to 40-K which operate with a limited power can be reduced.

In the meantime, even though the present disclosure has been described by assuming that the channel estimating apparatus 100 including the measuring signal generating unit 110, the reception strength acquiring unit 120, and the channel estimating unit 130, this is just an example. Depending on an example, the measuring signal generating unit 110 and the reception strength acquiring unit 120 are included in the transmitter 10 and the channel estimating unit 130 may be configured as an independent device to be included in the wireless power transmission system.

Now, a channel estimating process according to an exemplary embodiment of the present disclosure will be described in more detail.

Prior to description of the channel estimating process according to the present disclosure, a received signal strength (RSS) will be described first.

When it is considered that a k-th terminal 40-$k$, among k terminals, receives a measuring signal which is transmitted from the transmitter 10 according to the measuring beamforming vector w(t) and the measuring phase shift matrix $\Theta(t)$, the received signal of the k-th terminal 40-$k$ may be a measuring signal which is transmitted to the intelligent reflecting surface (IRS) 30 via the transmitting channel G(t) and then transmitted via a k-th reflecting surface channel $h_k(t)$ between the intelligent reflecting surface (IRS) 30 and the k-th terminal 40-$k$.

Accordingly, the k-th terminal 40-$k$ may calculate and feedback the received signal strength (RSS) $r_k(t)$ in a t-th time slot t using Equation 1.

$$r_k(t) = |h_k^H(t)\Theta(t)G^H(t)w(t) + n_k(t)| \quad \text{[Equation 1]}$$

Here, $n_k(t)$ is a Gaussian noise in which an average is 0 and a variance is $\sigma_k^2$. H is a Hermitian matrix.

As represented in Equation 1, it is confirmed that a wireless power reception performance of the k-th terminal 40-$k$ is determined by the transmitting channel G(t), the k-th reflecting surface channel $h_k(t)$, the measuring beamforming vector w(t), and the measuring phase shift matrix $\Theta(t)$.

Among them, since the measuring beamforming vector w(t) and the measuring phase shift matrix $\Theta(t)$ are controlled by the transmitter 10 and the controller 20, respectively, as a result, the wireless power reception performance may be determined by the transmitting channel G(t) and the k-th reflecting surface channel $h_k(t)$. Accordingly, in order to acquire a required wireless power reception performance using the intelligent reflecting surface 30, information about the transmitting channel G(t) and the k-th reflecting surface channel $h_k(t)$ need to be acquired.

In the meantime, it is assumed that the k-th reflecting surface channel $h_k(t)$ according to the present disclosure follows a first order auto-regressive channel model which changes with a correlation according to a time.

When the k-th reflecting surface channel $h_k(t)$ follows the first order auto-regressive channel model, the k-th reflecting surface channel $h_k(t)$ in the t-th time slot t may be represented by Equation 2 as a correlation format with a k-th reflecting surface channel $h_k(t-1)$ in a previous t-1-th time slot t-1.

$$h_k(t)=\beta_k h_k(t-1)+e_k(t), \forall k \quad \text{[Equation 2]}$$

Here, $\beta_k$ is a temporal fading coefficient $\beta_k \in [0, 1]$ with respect to the k-th reflecting surface channel $h_k(t)$ and indicates a channel correlation coefficient which is determined by a velocity of the k-th terminal 40-k. $e_k(t)$ indicates a time-variable noise term modeled by a Gaussian random vector in which an average is 0 and a variance is $1-\beta_k^2$, without having a spatial correlation.

In the meantime, it is assumed that the transmitter 10 and the intelligent reflecting surface (IRS) 30 according to the present disclosure have a fixed location without moving. Accordingly, a relative velocity of the transmitter 10 and the intelligent reflecting surface (IRS) 30 is 0 so that the temporal fading coefficient $\beta_k$ with respect to the transmitting channel G(t) may become 1. Accordingly, a transmitting channel G(t) in the t-th time slot t and a transmitting channel G(t−1) in a t−1-th time slot t−1 are the same as represented in Equation 3.

$$G(t)=G(t-1) \quad \text{[Equation 3]}$$

The channel estimating unit 130 according to the present disclosure may estimate the transmitting channel G(t) and the k-th reflecting surface channel $rh_k(t)$ using L recently acquired received signal strengths (RSS) $r_k(t)$. That is, when the current time slot is T, the channel estimating unit 130 estimates the transmitting channel G(t) and the k-th reflecting surface channel $h_k(t)$ using received signal strengths (RSS) $r_k(T-L+1), \ldots r_k(T)$ acquired for L time slots from a T−L+1-th time slot T−L+1 to a T-th time slot T along a predetermined length L of a sliding window.

Here, the k-th reflecting surface channel $h_k(t)$ of the t-th time slot t (here, t<T) may be represented by Equation 4 from Equation 2.

$$h_k(t)=\beta_k^{t-T}h_k(T)-\Sigma_{j=1}^{T-t-1}\beta_k^{t-T+j}e_k(T-j) \quad \text{[Equation 4]}$$

When Equation 4 is substituted with Equation 1, the received signal strengths (RSS) $r_k(t)$ may be represented by Equation 5.

$$r_k(t)=|\beta_k^{t-T}w^H(t)G\Theta^H(t)h_k(T)+\tilde{n}_k(t)| \quad \text{[Equation 5]}$$

Here, $\tilde{n}_k(t)=n_k(t)-\Sigma_{j=1}^{T-t-1}\beta_k^{t-T+j}w^H(t)G\Theta^H(t)e_k(T-j)$. G(t)= G(t−1) from Equation 3 so that in Equation 5, an index for the time slot is omitted.

In FIG. 5, since a received signal strength (RSS) $r_k(t)$ without having information about a phase is represented using an absolute function |·|, when the phase variable $\phi_k$ is additionally reflected to the received signal strength (RSS) $r_k(t)$ of Equation 5, it is represented by Equation 6.

$$r_k(t)e^{j\phi_k(t)}=\beta_k^{t-T}w^H(t)G\Theta^H(t)h_k(T)+\tilde{n}_k(t) \quad \text{[Equation 6]}$$

Based on Equation 6, when the received signal strength (RSS) vector which is formed by L received signal strengths $r_k(t)$ is represented with a bold letter $\mathbf{r}_k(t)$ to be distinguished from the received signal strength (RSS) $r_k(t)$, the received signal strength (RSS) vector $\mathbf{r}_k(t)=[r_k(t-L+1), r_k(t-L+2), \ldots, r_k(t)]^T$ may be simplified by Equation 7.

$$\mathbf{r}_k(T)^\circ e^{j\phi_k(T)}=\beta_k(T)^\circ M_G(T)h_k(T)+\tilde{n}_k(T), \text{ where}$$

$$e^{j\phi_k(T)}:=[e^{j\phi_k(T-L+1)}, \ldots, e^{j\phi_k(T)}]^T,$$

$$\beta_k(T):=[\beta_k^{-L+1},\beta_k^{-L+2}, \ldots, 1]^T,$$

$$M_G(T):=[(w^H(T-L+1)G\Theta^H(T-L+1))^T, \ldots, (w^H(T)G\Theta^H(T))^T]^T,$$

$$\tilde{n}_k(T):=[\tilde{n}_k(T-L+1), \ldots, \tilde{n}_k(T)]^T \quad \text{[Equation 7]}$$

Here, $\circ$ is a hadamard product symbol. $\tilde{n}_k(T)\tilde{n}_k(T)$ is a Gaussian noise vector in which an average is 0 and a covariance matrix is $R_k(T)$.

In Equation 7, $M_G(T)$ may be considered as transmitting and reflecting information which collectively represents a channel characteristic until the measuring beamforming vector w(t), the transmitting channel G(t), and the measuring phase shift matrix $\Theta(t)$ are combined and the intelligent reflecting surface (IRS) 30 reflects a measuring signal transmitted from the transmitter 10.

A covariance matrix $R_k(t)$ of the noise vector $\tilde{n}_k(T)$ may be represented by Equation 8.

$$[R_k(T)]_{p,q} = \begin{cases} \sigma_k^2 + (\beta_k^{2(p-L)}-1)w^H(p')GG^H w(p') & p=q \\ (\beta_k^{p+q-2L}-\beta_k^{-|q-p|})w^H(p')G\Theta^H(p')\theta(q')G^H w(q') & p \neq q \end{cases},$$

$$p' = T - L + p, q' = T - L + q \quad \text{[Equation 8]}$$

Here, p and q refer to a row and a column of the covariance matrix $R_k(t)$, respectively.

In the meantime, according to the present disclosure, a maximum likelihood estimation (MLE) technique may be used to estimate a reflecting surface channel $h=\{h_k\}_{k=1}^K$ for the transmitting channel G and the K terminals 40-1 to 40-K. However, in order to apply the maximum likelihood estimation (MLE) technique, a process of defining a probability model between a transmitting channel G and the reflecting surface channel $\{h_k\}_{k=1}^K$ to be estimated is necessary.

Therefore, a joint likelihood function between the received signal strength (RSS) vector $\mathbf{r}_k(t)$, the transmitting channel G, and the reflecting surface channel $\{h_k\}_{k=1}^K$ may be deduced to Equation 9 from Equation 7.

$$F(\Psi) = \prod_{k=1}^K \left( \frac{1}{\pi^L |R_k|} \exp\left\{ \left\| R_k^{-\frac{\lambda}{2}} (r_k^\circ e^{j\varphi} - \beta_k^\circ M_G h_k) \right\|^2 \right\} \right) \quad \text{[Equation 9]}$$

Here, $\Psi$ is an estimating variable set to be estimated and indicates a set $\Psi=(G,\{h_k\}_{k=1}^K,\{\emptyset_k\}_{k=1}^K)$ of the transmitting channel G, the reflecting surface channel $\{h_k\}_{k=1}^K$, and the phase variable $\{\hat{1}_k\}_{k=1}^K$.

When the maximum likelihood estimation (MLE) technique is applied using Equation 9, the channel estimating problem is set by Equation 10.

$$\hat{\Psi} = \arg \min_\Psi \Sigma_{k=1}^K \left( \log|R_k| + \left\| R_k^{-\frac{1}{2}}(r_k^\circ e^{j\varphi} - \beta_k^\circ M_G h_k) \right\|^2 \right) \quad \text{[Equation 10]}$$

Here, the channel estimating problem set by Equation is called a maximum likelihood phase retrieval (MLPR) problem. It is difficult to deduce a solution from the channel estimating problem of Equation 10, so that the covariance matrix $R_k(T)$ of the noise vector $\tilde{n}_k(T)$ is approximated to Equation 11.

$$[\tilde{R}_k]_{p,q} = \begin{cases} [R_k]_{p,q} & p = q \\ 0 & p \neq q \end{cases} \quad \text{[Equation 11]}$$

When the covariance matrix $\tilde{R}_k$ approximated to Equation 11 is used, a maximum likelihood phase retrieval (MLPR) problem of Equation 10 according to the maximum likelihood estimation IMLE) technique may be set as an approximated maximum likelihood phase retrieval (MLPR) AMLPR problem approximated to Equation 12.

$$\hat{\Psi} = \arg\min_{\Psi} \Sigma_{k=1}^{K}\left(\log|\tilde{R}_k| + \left\|\tilde{R}_k^{-\frac{1}{2}}(r_k^\circ e^{j\varphi} - \beta_k^\circ M_G h_k)\right\|^2\right) \quad \text{[Equation 12]}$$

As represented in Equation 12, the approximated maximum likelihood phase retrieval (AMLPR) problem may be solved using a block coordinate descent algorithm which is an iterative algorithm which repeats a process of fixing two variables among variables of the estimating variable set $\Psi(G,\{h_k\}_{k=1}^K,\{\emptyset_k\}_{k=1}^K)$ including the transmitting channel G, the reflecting surface channel $\{h_k\}_{k=1}^K$, and the phase variable $\{\emptyset_k\}_{k=1}^K$ and alternately fixing the remaining one variable.

That is, the channel estimating unit 130 may set initial values of the transmitting channel G, the reflecting surface channel $\{h_k\}_{k=1}^K$, and the phase variable $\{\emptyset_k\}_{k=1}^K$, first.

Here, the initial value may be set as the estimating variable set $\Psi(G,\{h_k\}_{k=1}^K,\{\emptyset_k\}_{k=1}^K)$ estimated at the previous time slot T−1. A this time, there is no estimating variable set $\Psi(G,\{h_k\}_{k=1}^K,\{\emptyset_k\}_{k=1}^K)$ estimated in the previous time slot T−1, initial values of the transmitting channel G, the reflecting surface channel $\{h_k\}_{k=1}^K$, and the phase variable $\{\emptyset_k\}_{k=1}^K$ of the estimating variable set $\Psi(G,\{h_k\}_{k=1}^K,\{\emptyset_k\}_{k=1}^K)$ may be set to arbitrary values.

When the initial value of the estimating variable set $\Psi(G,\{h_k\}_{k=1}^K,\{\emptyset_k\}_{k=1}^K)$ is set, the values of the transmitting channel G and the reflecting surface channel $\{h_k\}_{k=1}^K$ are fixed and an optimal phase variable $\{\emptyset_k\}_{k=1}^K$ corresponding to the fixed transmitting channel G and the fixed reflecting surface channel $\{h_k\}_{k=1}^K$ is calculated by Equation 13 first to be updated.

$$\emptyset_k = \arg(M_G h_k), \forall k \quad \text{[Equation 13]}$$

Here, arg(•) function indicates a phase of each component of the vector.

When the phase variable $\{\emptyset_k\}_{k=1}^K$ corresponding to the fixed transmitting channel G and the fixed reflecting surface channel $\{h_k\}_{k=1}^K$ is calculated by Equation 13, in a state in which the transmitting channel G and the calculated phase variable $\{\emptyset_k\}_{k=1}^K$ are fixed, an optimal reflecting surface channel $\{h_k\}_{k=1}^K$ is calculated by Equation 14 to be updated.

$$h_k((\beta_k^\circ M_G)^H \tilde{R}_k^{-1}(\beta_k^\circ M_G))^{-1}(\beta_k^\circ M_G)^H \tilde{R}_k^{-1}(r_k^\circ e^{j\varphi_k}), \forall k \quad \text{[Equation 14]}$$

When the phase variable $\{\emptyset_k\}_{k=1}^K$ and the reflecting surface channel $\{h_k\}_{k=1}^K$ are calculated by Equation 13 and Equation 14, respectively, an optimal transmitting channel G may be calculated based on the calculated phase variable $\{\emptyset_k\}_{k=1}^K$ and reflecting surface channel $\{h_k\}_{k=1}^K$. However, the problem of acquiring an optimal transmitting channel G is a non-convex problem so that the successive convex approximation technique is applied to acquire the transmitting channel G by Equation 15 to be updated.

$$G = \bar{G} - \frac{Vh(\bar{G})}{K} \quad \text{[Equation 15]}$$

Here, $\bar{G}$ refers to a previous transmitting channel before being updated. K is a step size and is acquired by a backtracking line search method. $\nabla h(G)$ is a gradient of a reflecting surface channel h according to the transmitting channel G and is calculated by Equation 16.

$$\nabla h(G) = \sum_{k=1}^{K} \sum_{l=1}^{L} 2\left[\frac{(\beta_k^{2(l-L)}-1)w(l')w^H(l')G}{(\sigma_k^2 + (\beta_k^{2(l-L)}-1)\|w^H(l')G\|^2)} - \frac{(\beta_k^{2(l-L)}-1)w(l')w^H(l')G}{((\sigma_k^2 + (\beta_k^{2(l-1L)}-1)\|w^H(l')G\|^2))^2} - \frac{\beta_k^{-L+1}w(l')(h_k)^H \theta(l')(r_k(l')e^{j\theta_k(l')} - \beta_k^{-L+1}w^H(l')G\theta^H(l')h_k)}{(\sigma_k^2 + (\beta_k^{2(l-L)}-1)\|w^H(l')G\|^2)}\right], l' = T - L + 1, \quad \text{[Equation 16]}$$

Here, $\sigma_k^2$ indicates a standard deviation of the Gaussian noise between the transmitter 10 and the k-th terminal 40-K.

In other words, the channel estimating unit 130 alternately selects one of the transmitting channel G, the reflecting surface channel $\{h_k\}_{k=1}^K$, and the phase variable $\{\emptyset_k\}_{k=1}^K$ from the estimating variable set $\Psi(G,\{h_k\}_{k=1}^K,\{\emptyset_k\}_{k=1}^K)$ to update.

Then, the change of the estimating variable set $\Psi(G,\{h_k\}_{k=1}^K,\{\emptyset_k\}_{k=1}^K)$ which is repeatedly updated is analyzed to determine whether the repeatedly updated estimating variable set $\Psi(G,\{h_k\}_{k=1}^K,\{\emptyset_k\}_{k=1}^K)$ is converged to a deviation within a predetermined range.

When the estimating variable set is not converged, one of the transmitting channel G, the reflecting surface channel $\{h_k\}_{k=1}^K$, and the phase variable $\{\emptyset_k\}_{k=1}^K$ is repeatedly alternately selected to update the estimating variable set $\Psi(G,\{h_k\}_{k=1}^K,\{\emptyset_k\}_{k=1}^K)$ according to Equations 13 to 15.

In contrast, if it is determined that the estimating variable set is converged, the update is stopped and the transmitting channel G and the reflecting surface channel $\{h_k\}_{k=1}^K$ of the last updated estimating variable set $\Psi(G,\{h_k\}_{k=1}^K,\{\emptyset_k\}_{k=1}^K)$ may be set as estimating channel information.

Thereafter, the transmitter 10 generates a beamforming vector w(t) according to the set estimating channel information to transmit a wireless power signal. The controller 20 which controls the intelligent reflecting surface (IRS) 30 generates a phase shift matrix Θ(t) according to the set estimating channel information to adjust a reflecting phase of the N reflective elements of the intelligent reflecting surface (IRS) 30 to efficiently transmit the wireless power signal transmitted from the transmitter 10 to the K terminals 40-1 to 40-K.

In summary, the phase variable updating unit 131 is applied with the measuring beamforming vector w(t) and the measuring phase shift matrix Θ(t) from the measuring signal generating unit 110 and is applied with the received signal strength (RSS) $r_k(t)$ from the received signal strength acquiring unit 120 to calculate and update the phase variable $\{\emptyset_k\}_{k=1}^K$ by Equation 13 using the transmitting channel G and the reflecting surface channel $\{h_k\}_{k=1}^K$ of the previously acquired estimating variable set $\Psi(G,\{h_k\}_{k=1}^K,\{\emptyset_k\}_{k=1}^K)$.

The reflecting surface channel updating unit 132 calculates and updates the reflecting surface channel $\{h_k\}_{k=1}^K$ by Equation 14, using the transmitting channel G of the estimating variable set $\Psi(G,\{h_k\}_{k=1}^{K},\{\emptyset_k\}_{k=1}^{K})$ and the phase variable $\{\emptyset_k\}_{k=1}^{K}$ updated by the phase variable updating unit 131.

The transmitting channel updating unit 133 acquires and updates the transmitting channel G by Equation 15 using the phase variable $\{\emptyset_k\}_{k=1}^{K}$ and the reflecting surface channel $\{h_k\}_{k=1}^{K}$ updated by the phase variable updating unit 131 and the reflecting surface channel updating unit 132.

When all variables of the estimating variable set $\Psi(G, \{h_k\}_{k=1}^{K},\{\emptyset_k\}_{k=1}^{K})$ are updated, the convergence determining unit 134 compares the updated estimating variable set $\Psi(G,\{h_k\}_{k=1}^{K},\{\emptyset_k\}_{k=1}^{K})$ and the previous estimating variable set to determine whether the change of each variable value of the estimating variable set $\Psi(G,\{h_k\}_{k=1}^{K},\{\emptyset_k\}_{k=1}^{K})$ is gradually reduced as compared with the previous change.

When the convergence determining unit 134 determines that each variable value is converged within a predetermined range from the change of the variable value, the convergence determining unit 134 sets the transmitting channel G and the reflecting surface channel $\{h_k\}_{k=1}^{K}$ of the estimating variable set $\Psi(G,\{h_k\}_{k=1}^{K},\{\emptyset_k\}_{k=1}^{K})$ as estimating channel information.

In contrast, when the change of the variable value is not reduced or reduction of the variable value is not converged within the predetermined range, the convergence determining unit 134 transmits the updated estimating variable set $\Psi(G,\{h_k\}_{k=1}^{K},\{\emptyset_k\}_{k=1}^{K})$ to the phase variable updating unit 131 to repeatedly update the estimating variable set $\Psi(G, \{h_k\}_{k=1}^{K},\{\emptyset_k\}_{k=1}^{K})$.

That is, when the accumulated change of the estimating variable set $\Psi(G,\{h_k\}_{k=1}^{K},\{\emptyset_k\}_{k=1}^{K})$ which is repeatedly updated is analyzed and it is determined that the estimating variable set is converged to a specific value, the convergence determining unit 134, the convergence determining unit 134 stops updating and acquires the last updated estimating variable set $\Psi(G,\{h_k\}_{k=1}^{K},\{\emptyset_k\}_{k=1}^{K})$ as estimated channel information.

Consequently, the channel estimating apparatus 100 according to the present disclosure can estimate all the transmitting channel G and the reflecting surface channel $\{h_k\}_{k=1}^{K}$ which is distinguished by the intelligent reflecting surface (IRS) 30 by feeding back only the received signal strength (RSS) $r_k(t)$ which is a scalar value from the K terminals 40-1 to 40-K so that the power consumption of the terminals 40-1 to 40-K which operate with a limited power can be reduced.

Figure 3:
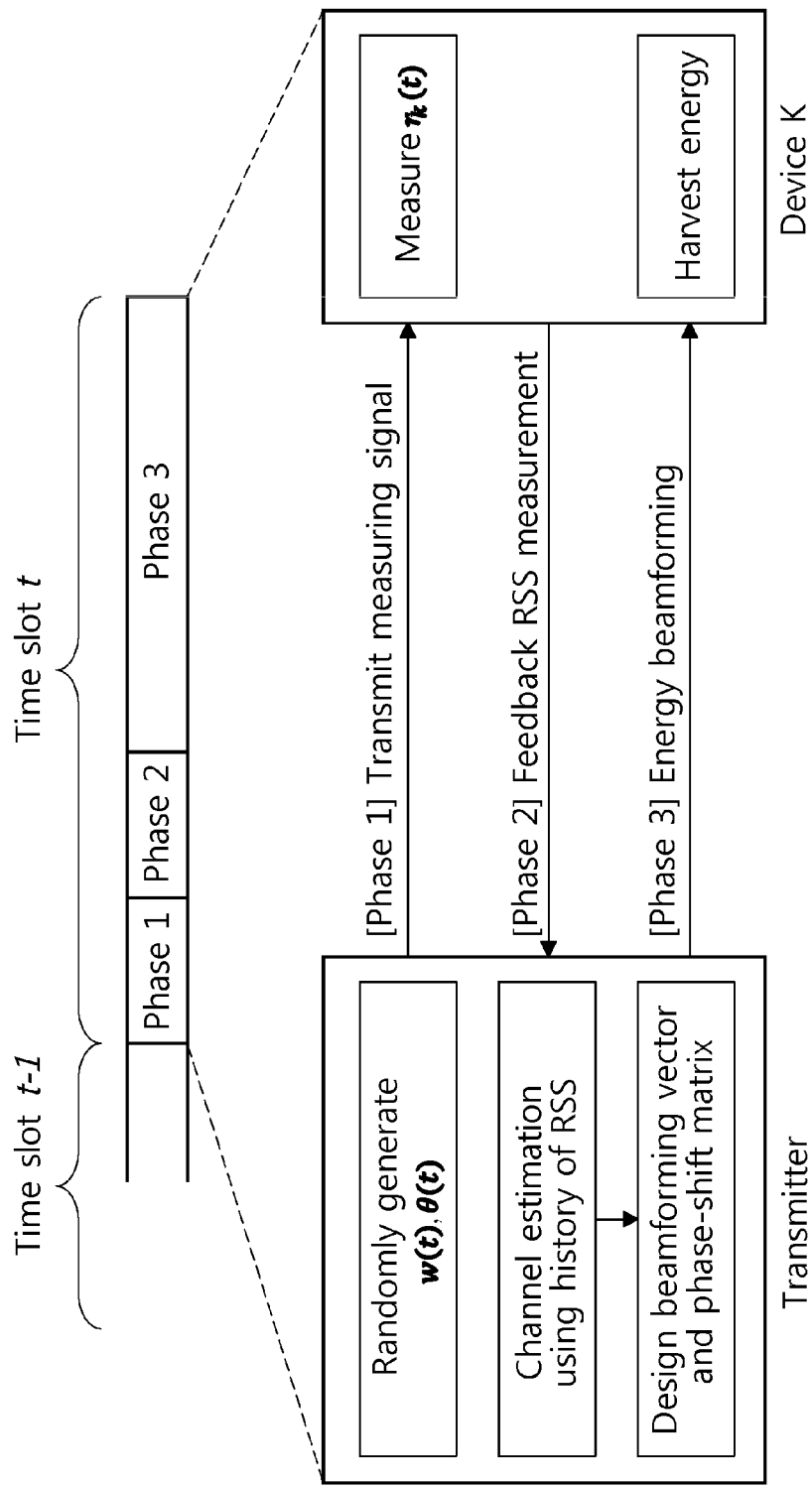
FIG. 3 is a view for explaining an operation of estimating a channel by a channel estimating apparatus illustrated in FIG. 2.

FIG. 3 is a view for explaining an operation of estimating a channel by a channel estimating apparatus illustrated in FIG. 2.

Referring to FIG. 3, in a time slot configured by "Phase 1", "Phase 2", and "Phase 3", the channel estimating operation according to the present disclosure may be performed in the periods corresponding to Phase 1 and Phase 2.

That is, the period "Phase 1", the transmitter 10 according to the present disclosure may generate a measuring beamforming vector w(t) and a measuring phase shift matrix Θ(t). Next, the transmitter 10 according to the present disclosure may transmit the measuring signal on the basis of the generated measuring beamforming vector w(t) and measuring phase shift matrix Θ(t). By doing this, the k-th terminal receives the measuring signal transmitted from the wireless power transmission system, that is, the transmitter according to the present disclosure.

In the period "Phase 2", the k-th terminal which receives the measuring signal measures a received signal strength (RSS) $r_k(t)$ which is a scalar value for the measuring signal and feeds back only the measured received signal strength (RSS) $r_k(t)$ to the wireless power transmission system, that is, the transmitter 10 according to the present disclosure. By doing this, the transmitter according to the present disclosure estimates the transmitting channel G(t) and the k-th reflecting surface channel $h_k(t)$ using a history (that is, a received signal strength fed-back during L predetermined previous time slots) of the received signal strength (RSS) $r_k(t)$ fed back from the k-th terminal.

That is, in order to acquire channel state information (CSI), the terminal of the related art needs to transmit feedback information including parameters such as a source selection indicator, a rank indicator (RI), a precoding matrix indicator (PMI), or a channel quality feedback. However, the terminal according to the present disclosure transmits only the received signal strength (RSS) which is a scalar value. By doing this, the channel estimating apparatus 100 according to the present disclosure estimates the channel state information (CSI) using the received signal strength (RSS) received from the terminal and reduces the power consumption of the terminal which operates with a limited power.

Further, in a period "Phase 3", the transmitter 10 according to the present disclosure may generate the beamforming vector w(t) and the phase shift matrix Θ(t) on the basis of the estimated transmitting channel G(t) and the k-th reflecting surface channel $h_k(t)$. Thereafter, the transmitter 10 and the intelligent reflecting surface (IRS) according to the present disclosure may transmit the power signal to the k-th terminal on the basis of the beamforming vector w(t) and the phase shift matrix Θ(t). By doing this, the k-th terminal receives the power signal transmitted from the wireless power transmission system, that is, the transmitter 10 according to the present disclosure to perform the wireless energy harvesting.

Now, a channel estimating method of a wireless power transmission system using an intelligent reflecting surface according to an exemplary embodiment of the present disclosure will be described with reference to FIG. 4.

Figure 4:
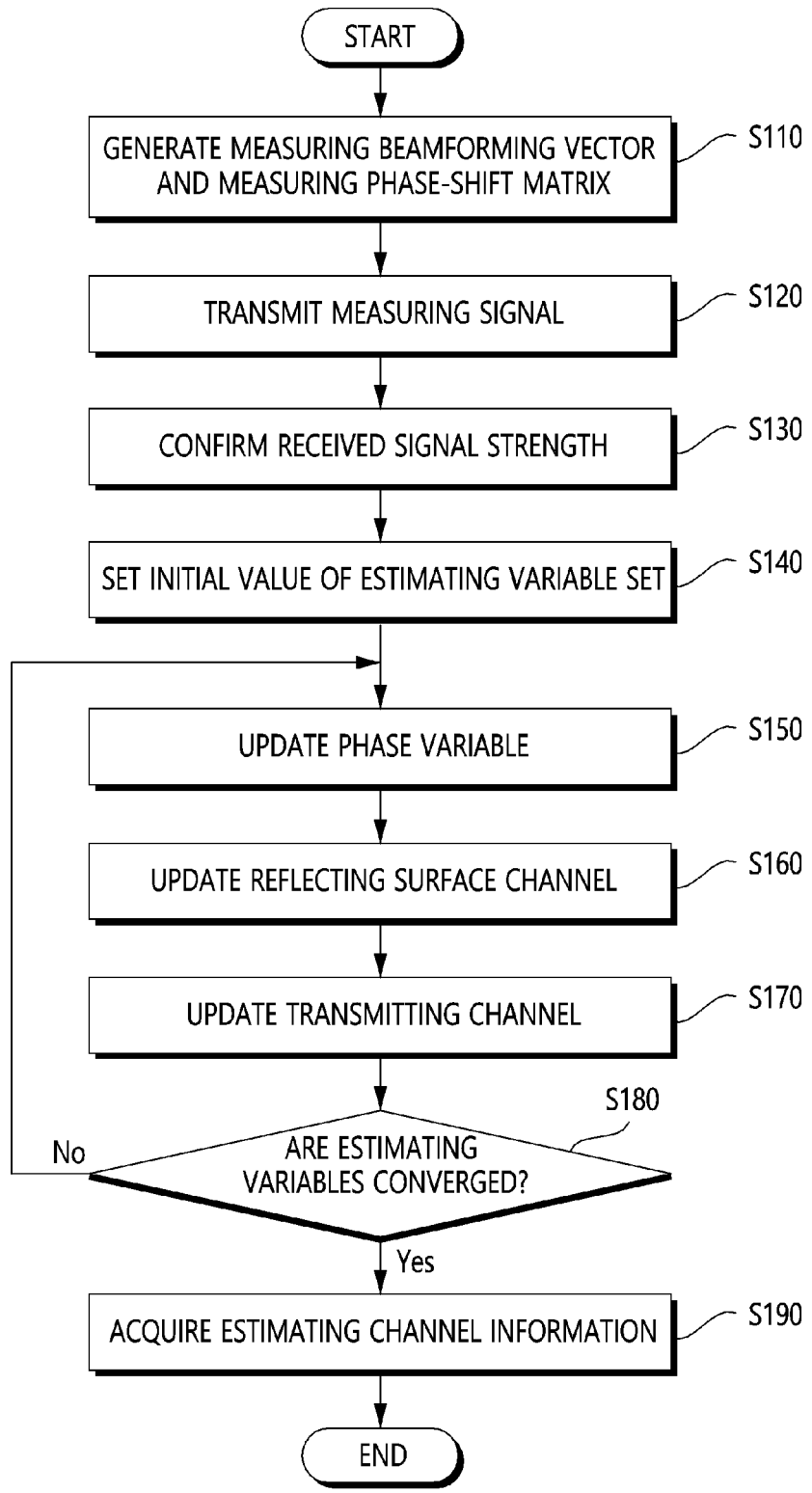
FIG. 4 is a flowchart for explaining an channel estimating method of a wireless power transmission system using an intelligent reflecting surface according to an exemplary embodiment of the present disclosure.

FIG. 4 is a flowchart for explaining an channel estimating method of a wireless power transmission system using an intelligent reflecting surface according to an exemplary embodiment of the present disclosure.

Referring to FIG. 4, the channel estimating apparatus 100 according to the present disclosure generates a measuring beamforming vector and a measuring phase shift matrix in step S110.

That is, the channel estimating apparatus 10 generates a measuring beamforming vector w(t) which allows the transmitter 10 to transmit the measuring signal and the measuring phase shift matrix Θ(t) to set a phase changed when the intelligent reflecting surface (IRS) 30 reflects the transmitted measuring signal.

here, the measuring beamforming vector w(t) and the measuring phase shift matrix Θ(t) may be arbitrarily generated.

Next, the channel estimating apparatus 100 transmits the measuring signal in step S120.

That is, the transmitter 10 beamforms the measuring signal according to the generated beamforming vector w(t) to transmit the beamformed measuring signal. The intelligent reflecting surface (IRS) 30 adjusts a phase of the measuring signal transmitted from the transmitter 10 with a reflecting phase designated by the measuring phase shift matrix Θ(t) to reflect the measuring signal.

Thereafter, the channel estimating apparatus 100 checks the received signal strength (RSS) in step S130.

That is, the channel estimating apparatus 100 checks a received signal strength $r_k(t)$ fed back from a terminal which receives the measuring signal reflected and transmitted from the intelligent reflecting surface (IRS) 30, among a plurality of terminals 40-1 to 40-K of the wireless power transmission system.

Here, the received signal strength (RSS) $r_k(t)$ is acquired by each terminal which receives the measuring signal, by Equation 1 to be fed back to the transmitter 10.

Next, the channel estimating apparatus 100 sets an initial value of the estimating variable set in step S140.

That is, the channel estimating apparatus 100 may set initial values of the transmitting channel G, the reflecting surface channel $\{h_k\}_{k=1}^{K}$, and the phase variable $\{\emptyset_k\}_{k=1}^{K}$ which are estimating variables to be estimated.

Here, the initial value may be set by values of previous estimating variables which are estimated at the last and when there is no previously set estimating value, the initial value may be set by an arbitrary value.

Next, the channel estimating apparatus 100 updates the phase variable in step S150.

That is, when the measuring beamforming vector w(t), the measuring phase shift matrix Θ(t), and the received signal strength (RSS) $r_k(t)$ are confirmed and the initial values of the transmitting channel G, the reflecting surface channel $\{h_k\}_{k=1}^{K}$, and the phase variable $\{\emptyset_k\}_{k=1}^{K}$ which are estimating variables are set, the channel estimating apparatus 100 calculates and updates an optimal phase variable $\{\emptyset_k\}_{k=1}^{K}$ by Equation 13 in a state in which the transmitting channel G and the reflecting surface channel $\{h_k\}_{k=1}^{K}$ among three estimating variables are fixed to currently values.

Next, the channel estimating apparatus 100 updates the reflecting surface channel in step S160.

That is, when the phase variable $\{\emptyset_k\}_{k=1}^{K}$ is updated, the channel estimating apparatus 100 100 calculates and updates an optimal reflecting surface channel $\{h_k\}_{k=1}^{K}$ by Equation 14 in a state in which the transmitting channel G and the updated phase variable $\{\emptyset_k\}_{k=1}^{K}$ are fixed.

Next, the channel estimating apparatus 100 updates the transmitting channel in step S170.

That is, the channel estimating apparatus 100 acquires and updates an optimal transmitting channel G by applying the successive convex approximation technique by Equation 15 and 16 in a state in which the update phase variable $\{\emptyset_k\}_{k=1}^{K}$ and reflecting surface channel $\{h_k\}_{k=1}^{K}$ are fixed.

Thereafter, the channel estimating apparatus 100 determines whether estimating variables of the estimating variable set are converged in step S180.

That is, when all three estimating variables to be estimated are updated, the channel estimating apparatus 100 analyzes an accumulated change with previously updated estimating variables to determine whether the estimating variables are converged.

When it is determined that the estimating variables are converged (Yes in step S180), the channel estimating apparatus 100 acquires estimating channel information in step S190.

That is, the channel estimating apparatus 100 stops additional updating of additional variables and sets the transmitting channel G and the reflecting surface channel $\{h_k\}_{k=1}^{K}$ among finally updated estimating variables as estimating channel information. By doing this, the transmitter 10 and the controller 20 of the wireless power transmission system generates the beamforming vector w(t) and the phase shift matrix Θ(t) according to the set estimating channel information to transmit and reflect the wireless power signal.

In contrast, when it is determined that the estimating variables are not converged (No in step S180), the channel estimating apparatus 100 calculates and updates the estimating variables on the basis of the currently updated estimating variables in steps S150 to S170.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protective scope of the present disclosure should be construed based on the following claims, and all the technical concepts in the equivalent scope thereof should be construed as falling within the scope of the present disclosure.

What is claimed is:

1. A channel estimating apparatus of a wireless power transmission system including a transmitter which transmits a power signal and an intelligent reflecting surface (IRS) which reflects the power signal transmitted from the transmitter to transmit the power signal to a plurality of terminals, the channel estimating apparatus comprising:
   a channel estimating unit configured to estimate a transmitting channel which is a channel between the transmitter and the intelligent reflecting surface (IRS) and a reflecting surface channel which is a channel between the intelligent reflecting surface (IRS) and a terminal, on the basis of a measuring beamforming vector which is generated to allow the transmitter to transmit a measuring signal, a measuring phase shift matrix which is generated to allow the intelligent reflecting surface (IRS) to designate a phase adjustment while reflecting the measuring signal, and a received signal strength (RSS) fed back from the terminal which receives the measuring signal,
   wherein the channel estimating unit estimates the transmitting channel and the reflecting surface channel by repeatedly performing a process of fixing two variables of an estimating variable set and alternatively updating the remaining variables, on the basis of the estimating variable set including the transmitting channel, the reflecting surface channel, and a phase variable representing a phase of the measuring signal received from the terminal,
   wherein the channel estimating unit estimates the transmitting channel and the reflecting surface channel until values of the variables of the estimating variable set are converged within a predetermined range, on the basis of an initial value of the estimating variable set, and wherein the channel estimating unit is configured to:
- fix the transmitting channel and the reflecting surface channel and update the phase variable by means of the fixed transmitting channel, the fixed reflecting surface channel, the measuring beamforming vector, the measuring phase shift matrix, and the received signal strength (RSS), on the basis of the initial value of the estimating variable set;
- fix the transmitting channel according to the initial value of the estimating variable set and the updated phase variable and update the reflecting surface channel;
- fix the updated phase variable and the updated reflecting surface channel and update the transmitting channel using a successive convex approximation technique; and
- determine whether updated variables of the estimating variable set are converged and acquire the reflecting surface channel and the transmitting channel according to the updated estimating variable set as estimating channel information when it is determined that the updated variables of the estimating variable set are converged.

2. The channel estimating apparatus according to claim 1, wherein when it is determined that a deviation between the updated estimating variable set and the estimating variable set is converged within a predetermined range, the convergence determining unit acquires the reflecting surface channel and the transmitting channel according to the updated estimating variable set as the estimating channel information, and when it is determined that the deviation between the updated estimating variable set and the estimating variable set is not converged within the predetermined range, the convergence determining unit transmits the updated estimating variable set to the phase variable updating unit to update the phase variable, the reflecting surface channel, and the transmitting channel again.

3. The channel estimating apparatus according to claim 1, wherein the initial value of the estimating variable set indicates an estimating variable set which is updated latest recently in a current time slot and when there is no estimating variable set which is updated in the current time slot, indicates an estimating variable set which is updated lastly in a time slot previous to the current time slot.

4. The channel estimating apparatus according to claim 1, wherein the phase variable updating unit updates the phase variable using Equation 1 on the basis of the fixed transmitting channel, the fixed reflecting surface channel, the measuring beamforming vector, the measuring phase shift matrix, and the received signal strength (RSS), $$\emptyset_k = \arg(M_G h_k), \forall k \quad \text{[Equation 1]}$$

where $h_k$ indicates a k-th reflecting surface channel between the intelligent reflecting surface (IRS) and a k-th terminal during L previous time slots, $\emptyset_k$, is the phase variable applied to add phase information to the received signal strength (RSS) fed back from the k-th terminal during the L previous time slots, and $M_G$ is a transmitting reflecting channel from the transmission of the transmitter to the reflection of the intelligent reflecting surface (IRS) during a period from a current time slot T to the L previous time slots and is calculated by Equation 2, $$M_G(T):=[(w^H(T-L+1)G\theta^H(T-L+1))^T, \ldots, (w^H(t)G\theta^H(T))^T]^T, \quad \text{[Equation 2]}$$

where w is the measuring beamforming vector, and $\theta$ is the measuring phase shift matrix.

5. The channel estimating apparatus according to claim 4, wherein the reflecting surface channel updating unit updates the reflecting surface channel by Equation 3, on the basis of the fixed transmitting channel and the fixed phase variable, $$h_k((\beta_k^\circ M_G)^H \tilde{R}_k^{-1}(\beta_k^\circ M_G))^{-1}(\beta_k^\circ M_G)^H \tilde{R}_k^{-1}(r_k^\circ e^{j\varphi_k}), \forall k \quad \text{[Equation 3]}$$

where $\beta_k$ is a channel correlation coefficient determined by a velocity of the k-th terminal during the L previous time slots, $r_k$ is the received signal strength (RSS) fed back from the k-th terminal during the L previous time slots, $\circ$ is a hadamard product symbol, and $\tilde{R}_k$ is an approximated covariance matrix acquired by approximating a covariance matrix $R_k$ which is a covariance matrix for a Gaussian noise vector between the transmitter and the k-th terminal during the L previous time slots.

6. The channel estimating apparatus according to claim 5, wherein the reflecting surface channel updating unit approximates and acquires the covariance vector $R_K$ for Gaussian noise vector which calculates the approximated covariance matrix $\tilde{R}_k$ by Equation 4 and Equation 5, $$[R_k(T)]_{p,q} = \begin{cases} \sigma_k^2 + (\beta_k^{2(p-L)} - 1)w^H(p')GG^Hw(p') & p = q \\ (\beta_k^{p+q-2L} - \beta_k^{-|q-p|})w^H(p')G\theta^H(p')\theta(q')G^Hw(q') & p \neq q \end{cases}, \quad \text{[Equation 4]}$$

$p' = T-L+p, q' = T-L+q$ where p and q are a row and a column of the covariance matrix $R_K$, respectively;

$$[\tilde{R}_k]_{p,q} = \begin{cases} [R_k]_{p,q} & p = q \\ 0 & p \neq q \end{cases}. \quad \text{[Equation 5]}$$

7. The channel estimating apparatus according to claim 5, wherein the transmitting channel updating unit updates the transmitting channel by Equation 6, on the basis of the fixed phase variable and the fixed reflecting surface channel, $$G = \tilde{G} - \frac{\nabla h(\tilde{G})}{K}, \quad \text{[Equation 6]}$$

where $\tilde{G}$ is the transmitting channel G before being updated, K is a step size $\nabla h(G)$ acquired by a backtracking line search method, and
is a gradient of the reflecting surface channel according to the transmitting channel.

8. The channel estimating apparatus according to claim 7, wherein the transmitting channel updating unit calculates the gradient $\nabla h(G)$ by Equation 7, $$\nabla h(G) = \sum_{k=1}^{K} \sum_{l=1}^{L} 2\left[ \frac{(\beta_k^{2(l-L)} - 1)w(l')w^H(l')G}{(\sigma_k^2 + (\beta_k^{2(l-L)} - 1)\|w^H(l')G\|^2)} - \frac{(\beta_k^{2(l-L)} - 1)w(l')w^H(l')G}{((\sigma_k^2 + (\beta_k^{2(l-1L)} - 1)\|w^H(l')G\|^2))^2} - \frac{(\beta_k^{-L+1}w(l')(h_k)^H\theta(l')(r_k(l')e^{j\theta_k(l')} - \beta_k^{-L+1}w^H(l')G\theta^H(l')h_k))}{(\sigma_k^2 + (\beta_k^{2(l-L)} - 1)\|w^H(l')G\|^2)} \right], \, l' = T - L + 1,$$

[Equation 7]

where $\sigma_k^2$ is a standard deviation of a Gaussian noise between the transmitter and the k-th terminal.

9. The channel estimating apparatus according to claim 1, wherein the measuring beamforming vector is generated to follow a complex Gaussian distribution which has an average of 0 and a variance according to a ratio of an average measuring power of the transmitter and a number of antennas of the transmitter.

10. The channel estimating apparatus according to claim 1, wherein the measuring phase shift matrix is generated such that the phase shift of the measuring signal according to N reflective elements of the intelligent reflecting surface (IRS) are uniformly distributed in the range of 0 to 27f independently to the time.

11. A channel estimating method of a wireless power transmission system including a transmitter which transmits a power signal and an intelligent reflecting surface (IRS) which reflects the power signal transmitted from the transmitter to transmit the power signal to a plurality of terminals, the channel estimating method comprising:
estimating a transmitting channel which is a channel between the transmitter and the intelligent reflecting surface (IRS) and a reflecting surface channel which is a channel between the intelligent reflecting surface (IRS) and a terminal, on the basis of a measuring beamforming vector which is generated to allow the transmitter to transmit a measuring signal, a measuring phase shift matrix which is generated to allow the intelligent reflecting surface (IRS) to designate a phase adjustment while reflecting the measuring signal, and a received signal strength (RSS) fed back from the terminal which receives the measuring signal,
wherein in the channel estimating step, the transmitting channel and the reflecting surface channel are estimated by repeatedly performing a process of fixing two variables of an estimating variable set and alternatively updating the remaining variables, on the basis of the estimating variable set including the transmitting channel, the reflecting surface channel, and a phase variable representing a phase of the measuring signal received from the terminal,
wherein in the channel estimating step, the transmitting channel and the reflecting surface channel are estimated until values of the variables of the estimating variable set are converged within a predetermined range, on the basis of an initial value of the estimating variable set, and wherein the channel estimating step includes:
fixing the transmitting channel and the reflecting surface channel and updating the phase variable by means of the fixed transmitting channel, the fixed reflecting surface channel, the measuring beamforming vector, the measuring phase shift matrix, and the received signal strength (RSS), on the basis of the initial value of the estimating variable set;
fixing the transmitting channel according to the initial value of the estimating variable set and the updated phase variable and updating the reflecting surface channel;
fixing the updated phase variable and the updated reflecting surface channel and updating the transmitting channel using a successive convex approximation technique; and
determining whether the updated variables of the estimating variable set are converged and acquiring the reflecting surface channel and the transmitting channel according to the updated estimating variable set as estimating channel information when it is determined that the variables are converged.

12. The channel estimating method according to claim 11, wherein in the acquiring of estimating channel information, when it is determined that a deviation between the updated estimating variable set and the estimating variable set is converged within a predetermined range, the reflecting surface channel and the transmitting channel according to the updated estimating variable set are acquired as the estimating channel information, and
when it is determined that the deviation between the updated estimating variable set and the estimating variable set is not converged within the predetermined range, the phase variable updating step, the reflecting surface channel updating step, and the transmitting channel updating step are performed again to update the phase variable, the reflecting surface channel, and the transmitting channel.

13. The channel estimating method according to claim 11, wherein the measuring beamforming vector is generated to follow a complex Gaussian distribution which has an average of 0 and a variance according to a ratio of an average measuring power of the transmitter and a number of antennas of the transmitter and
the measuring phase shift matrix is generated such that the phase shift of the measuring signal according to N reflective elements of the intelligent reflecting surface (IRS) are uniformly distributed in the range of 0 to $2\pi$ independently to the time.

* * * * *